United States Patent [19]
Josefsson et al.

[11] Patent Number: 6,010,571
[45] Date of Patent: *Jan. 4, 2000

[54] EXHAUST SYSTEMS FOR POWDER SPRAY BOOTH

[75] Inventors: Leif E. Josefsson, Lake Orion; Tim S. Slagle, Clarkston; Tim J. Sutton, Troy, all of Mich.

[73] Assignee: ABB Flexible Automation Inc.

[ * ] Notice: This patent is subject to a terminal disclaimer.

[21] Appl. No.: 08/950,281

[22] Filed: Oct. 14, 1997

Related U.S. Application Data

[63] Continuation of application No. 08/548,230, Oct. 25, 1995, Pat. No. 5,676,753.

[51] Int. Cl.⁷ ............................................. B05B 1/28
[52] U.S. Cl. ........................ 118/326; 454/50; 55/342; 55/DIG. 46
[58] Field of Search .................... 118/326, 303, 118/305, 309, 312, 324; 55/DIG. 46, 480, 482, 414, 342, 346; 454/50, 53

[56] References Cited

U.S. PATENT DOCUMENTS

| | | | |
|---|---|---|---|
| 1,697,079 | 1/1929 | Onsrud | 454/50 |
| 3,741,155 | 6/1973 | Hunder | 118/634 |
| 3,814,002 | 6/1974 | Rombach et al. | 118/312 |
| 3,921,576 | 11/1975 | Vertue | 118/634 |
| 4,328,012 | 5/1982 | Telchuk, Jr. et al. | 95/217 |
| 4,338,364 | 7/1982 | Kennon et al. | 427/424 |
| 4,409,009 | 10/1983 | Lissy | 118/326 |
| 4,616,594 | 10/1986 | Itho | 118/326 |
| 4,901,666 | 2/1990 | Nagasaka et al. | 118/634 |
| 5,173,118 | 12/1992 | Josefsson | 118/309 |
| 5,178,679 | 1/1993 | Josefsson | 118/326 |
| 5,326,599 | 7/1994 | Shutic | 427/478 |
| 5,676,753 | 10/1997 | Joseffson et al. | 118/326 |
| 5,690,995 | 11/1997 | Fischli et al. | 118/312 |

FOREIGN PATENT DOCUMENTS

| | | |
|---|---|---|
| 29 36 367 | 3/1981 | Germany . |
| 3640699 | 6/1988 | Germany . |
| 41 16 897 A1 | 11/1992 | Germany . |
| 54-71137 | 11/1977 | Japan . |
| 1212617 | 2/1986 | U.S.S.R. . |
| 2 160 639 | 5/1988 | United Kingdom . |

*Primary Examiner*—Laura Edwards
*Attorney, Agent, or Firm*—Harness, Dickey & Pierce, P.L.C.

[57] ABSTRACT

A paint spray booth with capability to separately exhaust clean powder paint overspray by a clean overspray upper exhaust system at floor level, and the additional exhaust air and paint overspray passing through a grated floor and conveyor system is exhausted by a lower exhaust system. The upper and lower exhaust systems each include a pair of channels having a first and a second sloping surface with a slot disposed at a lower portion thereof. The slot opens into an exhaust duct which extends longitudinally along the paint spray booth. The upper exhaust channels are disposed beneath a surface of a body to be painted, while the lower exhaust channels are disposed beneath a grated floor and the upper exhaust channels.

8 Claims, 4 Drawing Sheets

EXHAUST SYSTEMS FOR POWDER SPRAY BOOTH

This is a continuation of U.S. patent application Ser. No. 08/548,230, filed Oct. 25, 1995 now U.S. Pat. No. 5,676,753.

BACKGROUND OF THE INVENTION

1. Field of the Invention

The present invention relates to an exhaust system for a powder spray booth. In particular, the exhaust system of the present invention relates to a powder spray booth with capability to separately exhaust clean powder paint overspray by means of a separate exhaust system at floor level, and the additional exhaust air which passes through the floor grating and conveyor system will be exhausted by a lower exhaust system.

2. Description of the Background Art

Designs of conventional paint spray booths have traditionally attempted to deal with improving paint transfer efficiency therein. Much of the paint spray, especially in powder spray booths, never reaches the target being painted and becomes so-called "overspray" which must be removed from an air stream in a paint spray booth. Overspray which is not properly removed from the air stream in the booth leads to build up problems on the walls of the paint spray booth surrounding the paint spray application area.

One known approach to exhausting overspray in a powder spray booth is taught in U.S. Pat. No. 5,178,679 to Josefsson, wherein a pair of longitudinally extending channels are provided on each lateral side of a conveyor system which carries an object to be painted through the paint spray booth. However, the exhaust system of the Josefsson patent lacks the capability to separately exhaust clean powder paint overspray by means of a first exhaust system at floor level, with additional exhaust air and overspray passing through the floor grating and conveyor system being exhausted by means of a lower exhaust system.

SUMMARY OF THE INVENTION

It is an object of the present invention to provide a powder spray booth with capability to separately exhaust clean powder paint overspray by means of an upper exhaust system at floor level directly beneath a surface of an object to be painted.

It is a further object of the present invention to provide an additional exhaust air system which collects powder paint overspray which passes through the floor grating and conveyor system of a powder spray paint booth.

It is yet another object of the present invention to provide a cover for the first exhaust system which protects the clean overspray exhaust system from contaminants during maintenance of the paint spray booth.

These and other objects of the present invention are obtained by providing an overspray exhaust system for use in a floor of a spray booth, comprising: an upper exhaust system including an upper channel having first and second sloping surfaces; and a lower exhaust system including a lower channel having first and second sloping surfaces, said upper channel being disposed between said first and second sloping surfaces of said lower channel.

The objects of the present invention are also obtained by providing a spray booth with an improved overspray exhaust system, comprising: a housing including first and second sidewalls, and a grated flooring; an upper exhaust system disposed at floor level and including an upper channel having first and second sloping surfaces disposed in an opening in said grated flooring; and a lower exhaust system including a lower channel having first and second sloping surfaces disposed below said grated flooring, said upper channel being disposed between said first and second sloping surfaces of said lower channel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein.

DETAILED DESCRIPTION OF THE PREFERRED EMBODIMENTS

Figure 1:
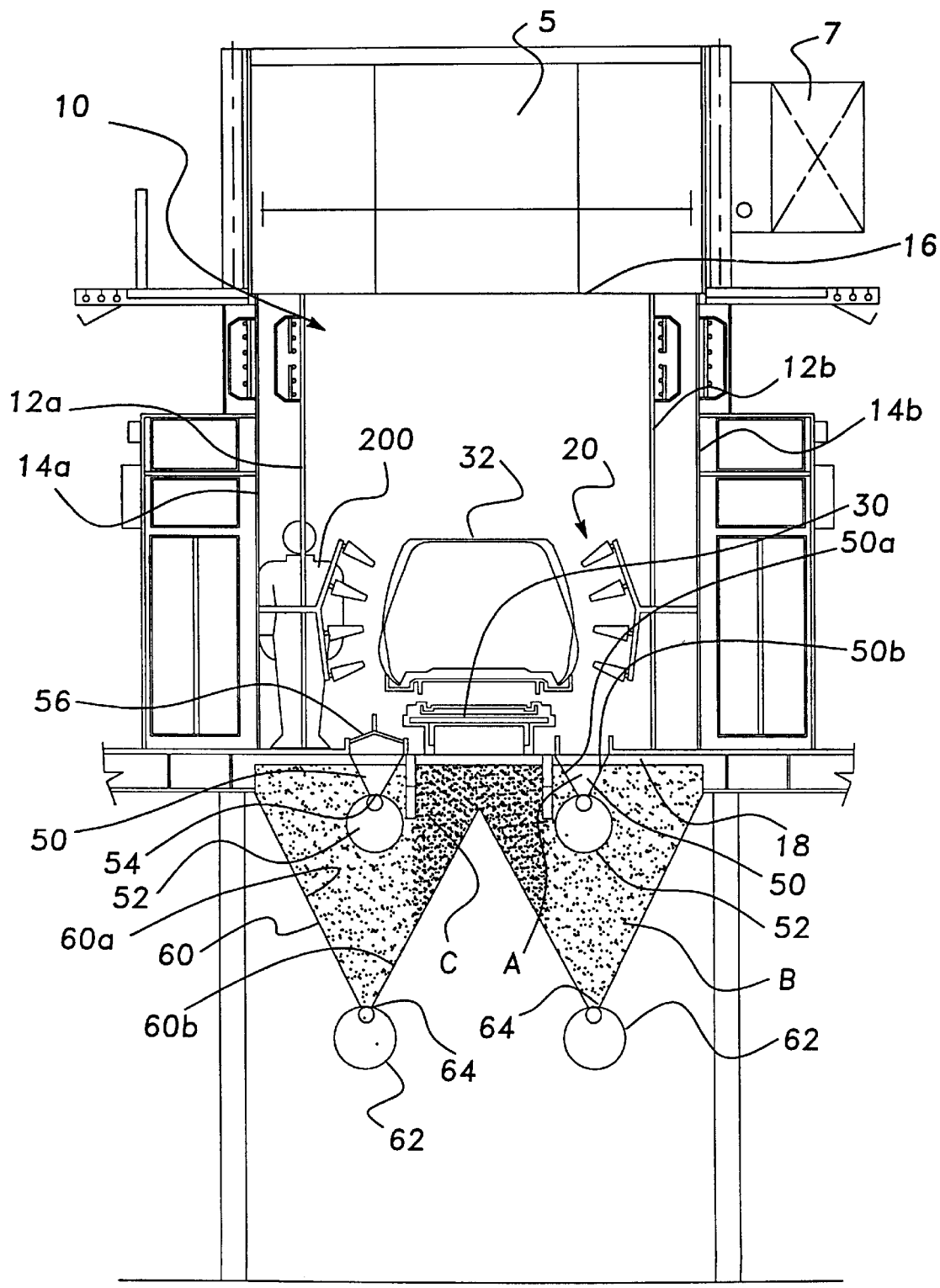
FIG. 1 is a lateral sectional view in the vicinity of a paint spray booth having an exhaust system arrangement in accordance with the principles of the present invention.

With reference to FIG. 1, a paint spray booth 10 is shown with an overspray exhaust system according to the present invention. The paint spray booth 10 includes a pair of outer side walls 14a, 14b and a ceiling 16 which extends across the top of the paint spray booth 10. A grated floor 18 is provided at the bottom of the paint spray booth 10. The grated floor 18 includes openings which allow the passage of powder overspray and air. A pair of perforated liners or walls 12a, 12b are disposed laterally inward from the outer walls 14a, 14b. A plenum 5 is disposed above the ceiling 16 and is connected to an air inlet duct 7. The plenum 5 provides compressed air to the chamber disposed between the outer walls 14a, 14b and the perforated liners or walls 12a, 12b. The compressed air passes through the perforated liners or walls 12a, 12b so as to counteract deposition of paint powder on the wall, thus facilitating cleaning of the paint spray booth 10. The plenum 5 and remaining air inlet system can be any conventional system and will not be further described herein.

Paint spray mechanisms 20 are provided adjacent to each of the perforated liners or walls 12a, 12b of the paint spray booth 10. A conveyor 30 extends longitudinally through the paint spray booth 10. The conveyor 30 carries objects such as automobile bodies 32, through the paint spray booth 10 during a painting operation. The paint spray mechanisms 20 and conveyor 30 can be any conventional paint spray mechanism and conveyor.

The exhaust system shown in FIG. 1 includes an upper exhaust system having a pair of upper channels 50 for exhausting clean overspray/air. The upper channels 50 include first and second sloping surfaces 50a, 50b. Although the sloping surfaces 50a, 50b are preferably angled relative to a vertical plane, it is anticipated that the sloping surfaces 50a, 50b could be substantially vertical without departing from the scope of the present invention. An upper exhaust duct 52 is disposed beneath each of the upper channels 50. A slot 54 which is formed by the lower ends of the first and second sloping surfaces 50a, 50b of each of the channels 50 opens into the upper exhaust duct 52. The upper channels 50 are disposed in an opening in the grated floor 18 of the paint spray booth 10.

A pair of lower channels 60 which are wider than the upper channels 50 are disposed beneath the grated floor 18. Each of the lower channels 60 include first and second sloping surfaces 60a, 60b which are disposed on opposite sides of one of the upper channels 50. A slot 64 is formed at the lower end of each of the first and second sloping surfaces 60a, 60b of each of the lower channels 60. The slot 64 opens into a lower exhaust duct 62.

A cover 56 is provided for covering the upper channels 50 during maintenance or cleaning of the paint spray booth 10. As shown in the left half portion of FIG. 1, the cover 56 is shown in place over the upper channel 50 while a maintenance person 200 is illustrated within the paint spray booth 10. During a painting operation, the cover 56 can be opened or removed from the opening of the upper channel 50. Preferably, the cover 56 is hinged to the opening of the upper channels 50, as shown in the right half portion of FIG. 1. Each of the upper channels 50 are disposed adjacent to the conveyor 30 and beneath the outer edge of the body 32 which is being painted. In this way, clean powder paint overspray is received in the upper channels 50 as it falls directly from the body 32. The additional exhaust air and overspray passing through the grated floor 18 and the conveyor 30 is exhausted by the lower channels 60. Thus, the dirt picked up by the overspray and air passing through the conveyor 30 and the grated floor 18 is separated from the clean powder paint overspray.

Figure 2:
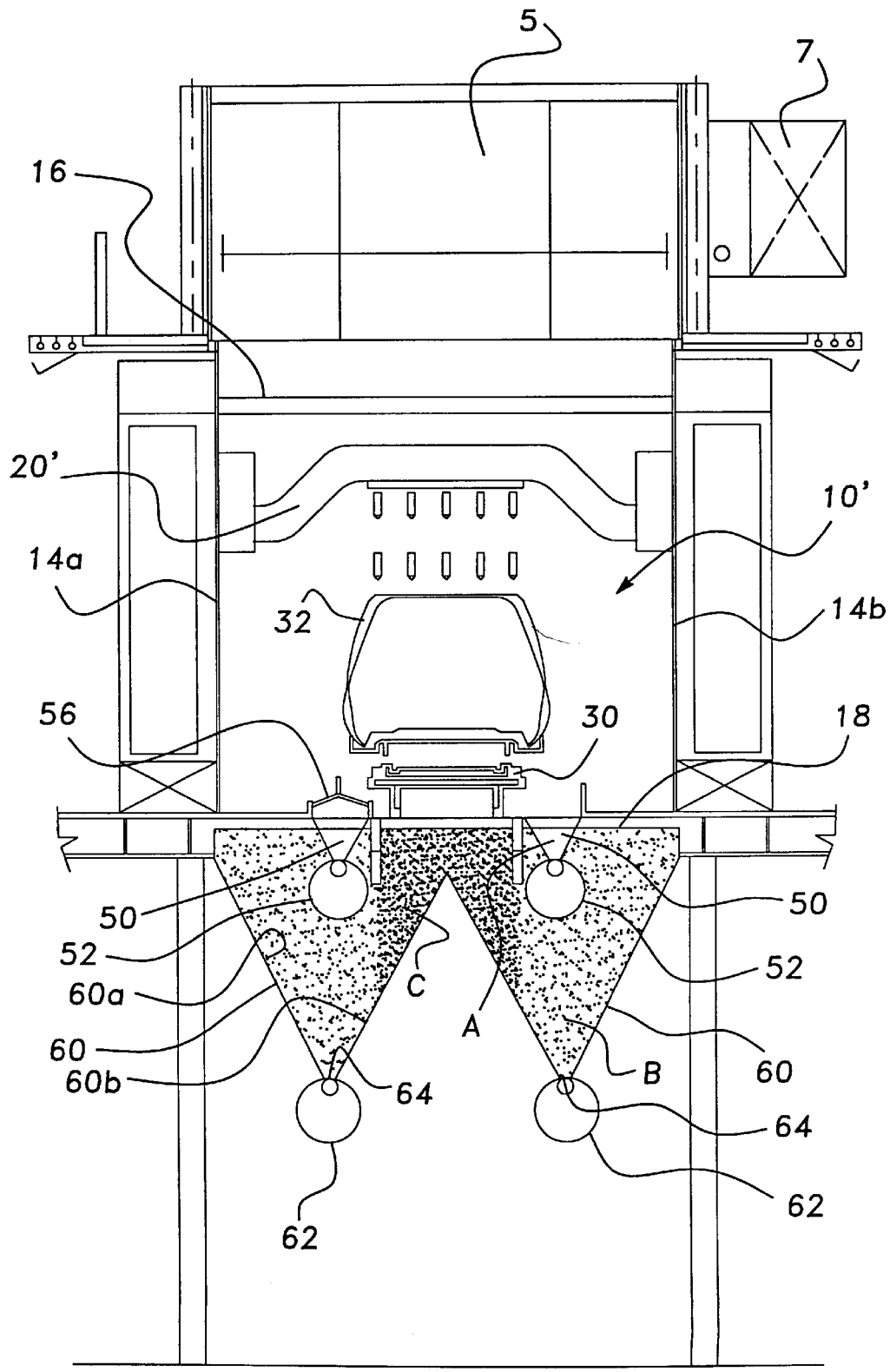
FIG. 2 is a further lateral sectional view in the vicinity of a paint spray booth which illustrates a roof painting operation in accordance with the principles of the present invention.

FIG. 2 illustrates a paint spray booth 10' which is substantially the same as the paint spray booth 10 shown in FIG. 1, however, the perforated liner or walls 12a, 12b have been removed and the paint spray mechanism 20' is disposed directly above the conveyor 30 to paint the roof of the body 32. The paint spray mechanism 20' can be any conventional paint spray mechanism. The exhaust system shown in FIG. 2 is virtually identical to the exhaust system shown in FIG. 1 and thus will not be described further.

In FIGS. 1 and 2, the areas beneath the floor are designated with different shadings. The area "A" which has no shading is the area within the upper channels 50 of the upper exhaust system. The area "A" receives clean powder/air exhaust. The area "B" which is represented by a less dense shading represents the walk space underneath the grated floor 18. The area "B" under the walk space receives dirt which is generated by maintenance and passes through the grated floor 18. The area "C" which is designated by dense shading represents the walk space beneath the conveyor system 30. The area "C" receives dirt generated both by maintenance and by the conveyor system 30.

Figure 3:
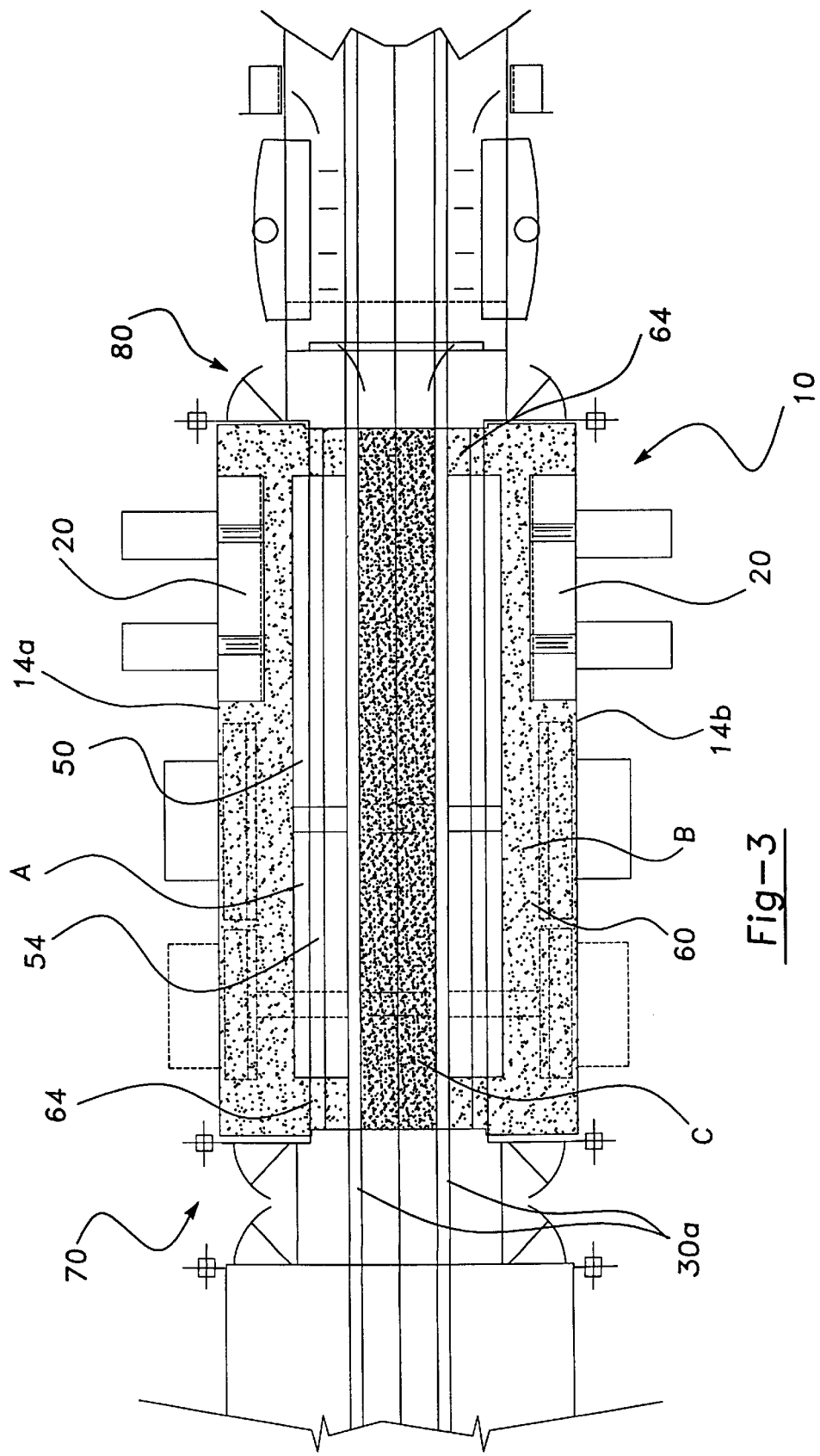
FIG. 3 is a partial sectioned top view of the booth of FIG. 1.

With regard to FIG. 3, a schematic top plan view of the paint spray booth is shown. As shown in FIG. 3, the side walls 14a, 14b of the paint spray booth 10 extend in parallel to the conveyor rails 30a. Paint spray mechanisms 20 are disposed along each side wall 14a, 14b. A pair of upper channels 50 are shown extending parallel to the conveyor rails 30a. The inlet slots 54 extend along the bottom of the upper channels 50. The lower channels 60 are shown beneath the upper channels 50. The slots 64 extend along the bottom of the lower channels 60. The area "A" which is above the upper channels 50 again is provided with no shading and represents the area which receives clean powder/air exhaust. The area "B" which is the walk space above the lower channel 60 is provided with less dense shading and designates an area which receives dirt generated by maintenance. The area "C" is represented by dense shading and represents the walk space beneath the conveyor system which receives dirt generated by maintenance and by the conveyor system 30. Paint spray booth 10 has an entrance end 70 and an exit end 80.

Figure 4:
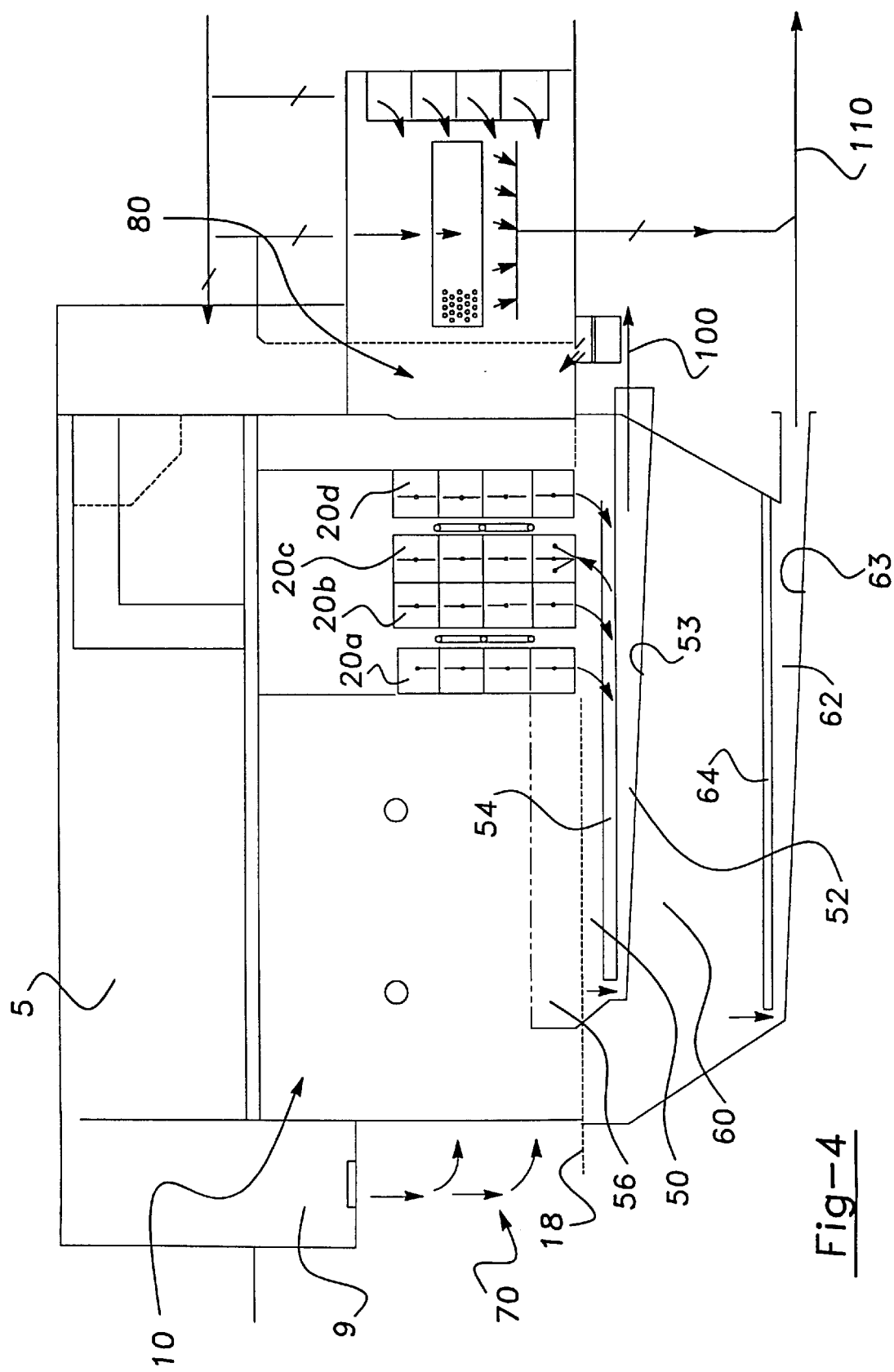
FIG. 4 is a schematic side view of the paint spray booth which illustrates the longitudinal arrangement of the upper and lower exhaust systems and the downwardly sloping upper and lower exhaust ducts.

With respect to FIG. 4, a schematic side view of the paint spray booth 10 is shown. In FIG. 4, the plenum 5 is disposed above the paint spray booth 10. The air inlet 9 supplies forced air to the entrance end 70 of the paint spray booth 10 as well as any other designated areas. It is noted the U.S. Pat. No. 5,178,679 to Josefsson, which is herein incorporated by reference, discloses a preferred method of maintaining flow of exhaust air along the path of travel of the painted objects which increases paint transfer efficiency. Paint spray mechanisms 20a–20d are disposed on the sidewall of the paint spray booth 10. A grated floor 18 is shown above the air exhaust system. The air exhaust system includes an upper exhaust system including upper channels 50 and lower channels 60. The upper channels 50 are provided with an inlet slot 54 at a lower portion thereof The inlet slot 54 opens into the upper exhaust duct 52. The upper exhaust duct 52 has a downwardly sloping lower surface 53.

The lower exhaust system includes lower channels 60 which are provided with an inlet slot 64 at a lower end thereof. The inlet slots 64 open into lower exhaust ducts 62. The lower exhaust ducts 62 have a downwardly sloping lower surface 63. The upper exhaust duct 52 exhausts the clean powder/air exhaust in the direction 100 into a clean powder recycle bin. The lower exhaust duct 62 exhausts the contaminated powder/air exhaust in a direction 110 into a contaminated powder bin.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An overspray exhaust system for use in a floor of a paint spray booth, comprising:

an upper exhaust system including an upper channel having first and second sloping surfaces and an upper exhaust duct disposed below said first and second sloping surfaces of said upper channel for conveying overspray, received through said upper channel, in a generally horizontal direction;

a lower dry exhaust system including a lower channel having first and second sloping surfaces converging to an inlet slot which opens into a lower exhaust duct, said upper channel and said upper exhaust duct being disposed between said first and second sloping surfaces of said lower channel; and wherein said upper and lower exhaust ducts have an increasing diameter from one end to an exit end.

2. The exhaust system according to claim 1, wherein said upper exhaust system includes an exhaust inlet slot disposed between said upper channel and said exhaust duct.

3. The exhaust system according to claim 1, wherein said lower exhaust system includes an exhaust duct disposed below said first and second sloping surfaces of said lower channel for conveying overspray, received through said lower channel, in a generally horizontal direction.

4. The exhaust system according to claim 1, further comprising a grated floor disposed above said lower channel.

5. The exhaust system according to claim 1, further comprising a cover for covering said upper channel.

6. The exhaust system according to claim 1, wherein said upper and lower exhaust systems are disposed beneath a paint application zone of a spray booth.

7. The exhaust system according to claim 1, wherein said upper exhaust system is disposed below an edge of a body to be painted and receives clean overspray/air exhaust.

8. An overspray exhaust system for use in a floor of a paint spray booth, comprising:

an upper dry exhaust system including an upper channel having first and second sloping surfaces;

a lower dry exhaust system including a lower channel having first and second sloping surfaces, said upper channel being disposed between said first and second sloping surfaces of said lower channel; and wherein said upper exhaust system includes an upper exhaust duct disposed below said first and second sloping surfaces of said upper channel and said lower exhaust system includes a lower exhaust duct disposed below said first and second sloping surfaces of said lower channel, said upper and lower exhaust ducts each having a lower surface which slopes downwardly.

\* \* \* \* \*